(12) United States Patent
Filippov et al.

(10) Patent No.: US 11,805,250 B2
(45) Date of Patent: Oct. 31, 2023

(54) PERFORMING INTRA-PREDICTION USING INTRA REFERENCE SAMPLE FILTER SWITCHING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 269 days.

(21) Appl. No.: 17/210,136

(22) Filed: Mar. 23, 2021

(65) Prior Publication Data

US 2021/0211658 A1    Jul. 8, 2021

Related U.S. Application Data

(63) Continuation of application No. PCT/RU2019/050159, filed on Sep. 23, 2019.

(60) Provisional application No. 62/735,182, filed on Sep. 23, 2018.

(51) Int. Cl.
*H04N 19/117* (2014.01)
*H04N 19/105* (2014.01)
*H04N 19/159* (2014.01)
*H04N 19/132* (2014.01)
*H04N 19/176* (2014.01)

(52) U.S. Cl.
CPC ......... *H04N 19/117* (2014.11); *H04N 19/105* (2014.11); *H04N 19/132* (2014.11); *H04N 19/159* (2014.11); *H04N 19/176* (2014.11)

(58) Field of Classification Search
CPC .. H04N 19/117; H04N 19/105; H04N 19/132; H04N 19/159; H04N 19/176; H04N 19/80
See application file for complete search history.

(56) References Cited

U.S. PATENT DOCUMENTS

| | | |
|---|---|---|
| 2015/0023405 A1 | 1/2015 | Joshi et al. |
| 2015/0063457 A1 | 3/2015 | Gamei et al. |
| 2016/0373743 A1 | 12/2016 | Zhao et al. |
| 2018/0005408 A1 | 1/2018 | Sato |
| 2018/0091825 A1* | 3/2018 | Zhao .................... H04N 19/117 |

(Continued)

FOREIGN PATENT DOCUMENTS

WO   2020013735 A1   1/2020

OTHER PUBLICATIONS

Filippov et al., "CE3: Intra reference sample interpolation filter (Test 3.1.4)," Joint Video Experts Team (JVET) of ITU-T SG 16 WP 3 and ISO/IEC JTC 1/SC 29/WG 11, 12th Meeting: Macao, MO, Document: JVET-L0275-v1, pp. 1-5 (Oct. 3-12, 2018).

(Continued)

*Primary Examiner* — Joseph W Becker
(74) *Attorney, Agent, or Firm* — Leydig, Voit & Mayer, Ltd.

(57) ABSTRACT

A method for intra reference sample filter switching for intra-prediction is described herein. The method comprises determining an intra prediction mode and an aspect ratio of a block to be predicted, and selecting an interpolation filter or a reference sample smoothing filter based on the intra prediction mode and the aspect ratio.

20 Claims, 9 Drawing Sheets

(56) References Cited

U.S. PATENT DOCUMENTS

2018/0176468 A1    6/2018  Wang et al.
2018/0288413 A1*  10/2018  Filippov ............... H04N 19/50

OTHER PUBLICATIONS

Van Der Auwera et al., "CE3-related: On MDIS and intra interpolation filter switching," Joint Video Experts Team (JVET) of ITU-T SG 16 WP 3 and ISO/IEC JTC 1/SC 29/WG 11, 11th Meeting: Ljubljana, SI, Document: JVET-K0064-v1, Total 7 pages (Jul. 10-18, 2018).

Filippov et al., "CE3-related: Interpolation filtering for intra-prediction within rectangular blocks," Joint Video Experts Team (JVET) of ITU-T SG 16 WP 3 and ISO/IEC JTC 1/SC 29/WG 11, 11th Meeting: Ljubljana, SI, Document: JVET-K0518-v1, Total 3pages (Jul. 10-18, 2018).

"Series H: Audiovisual and Multimedia Systems, Infrastructure of audiovisual services—Coding of moving video, Video coding for low bit rate communication," ITU-T H.263, total 226 pages, ITU-T Telecommunication Standardization Sector of ITU, Geneva, Switzerland (Jan. 2005).

"Series H: Audiovisual and Multimedia Systems, Infrastructure of audiovisual services—Coding of moving video, Advanced video coding for generic audiovisual services," ITU-T H.264, total 812 pages, ITU-T Telecommunication Standardization Sector of ITU, Geneva, Switzerland (Apr. 2017).

"Series H: Audiovisual and Multimedia Systems, Infrastructure of audiovisual services—Coding of moving video. High efficiency video coding," ITU-T H.265, total 692 pages, ITU-T Telecommunication Standardization Sector of ITU, Geneva, Switzerland (Feb. 2018).

* cited by examiner

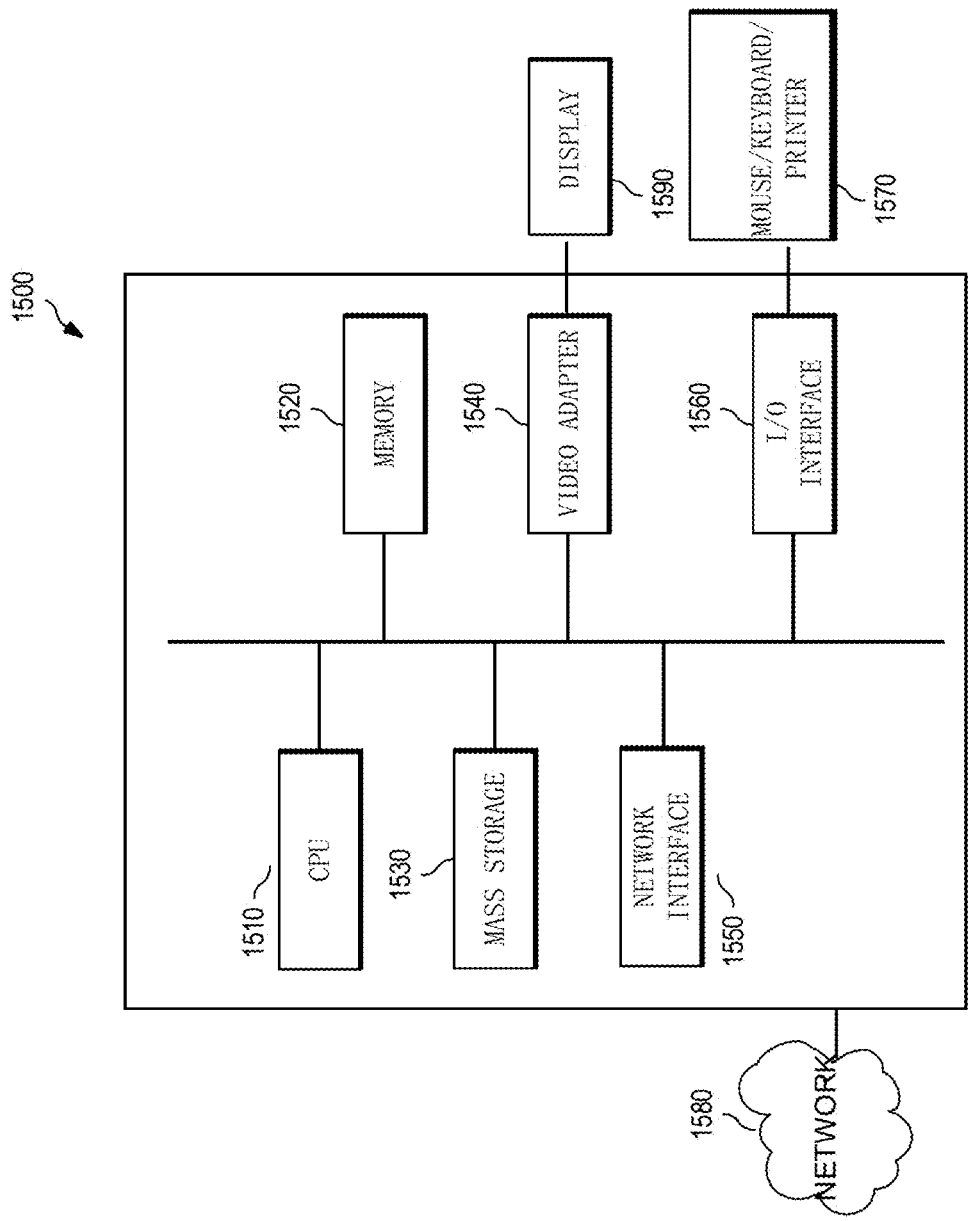

PERFORMING INTRA-PREDICTION USING INTRA REFERENCE SAMPLE FILTER SWITCHING

CROSS-REFERENCE TO RELATED APPLICATIONS

This application is a continuation of International Application No. PCT/RU2019/050159, filed on Sep. 23, 2019, which claims priority to U.S. Patent Application No. 62/735,182, filed on Sep. 23, 2018. The disclosures of the aforementioned applications are hereby incorporated by reference in their entireties.

The present disclosure relates to the technical field of image and/or video coding and decoding, and in particular to method and apparatus for aspect-ratio dependent filtering for intra-prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra- and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

Interpolation filter selection is harmonized with the decision on main reference side selection. Both of these decisions currently rely on comparison of intra prediction mode with the diagonal (45 degree) direction.

SUMMARY

Apparatus and method for intra prediction are disclosed. The apparatus and method use an alternative direction for thresholding an intra prediction mode during interpolation filter or smoothing filter selection process. Specifically, this direction corresponds to the angle of a main diagonal of the block to be predicted.

This embodiment proposes a mechanism to select different reference sample filters in order to consider orientation of a block. Specifically, width and height of a block are checked independently so that different reference sample filters are applied to reference sample located on different sides of a block to be predicted.

Embodiments of the embodiment are described in the claims and in the below description.

The scope of protection is defined by the claims.

BRIEF DESCRIPTION OF DRAWINGS

In the following exemplary embodiments are described in more detail with reference to the attached figures and drawings, in which:

FIG. 8 is an embodiment of Usage of different interpolation filters depending on which side the reference samples being used belong to.

FIG. 9 is a schematic diagram illustrating an exemplary structure of an apparatus.

DETAILED DESCRIPTION OF EMBODIMENTS

In the following description, reference is made to the accompanying drawings, which form part of the disclosure, and in which are shown, by way of illustration, specific aspects in which the embodiment may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block (video block) for representation.

Figure 1:
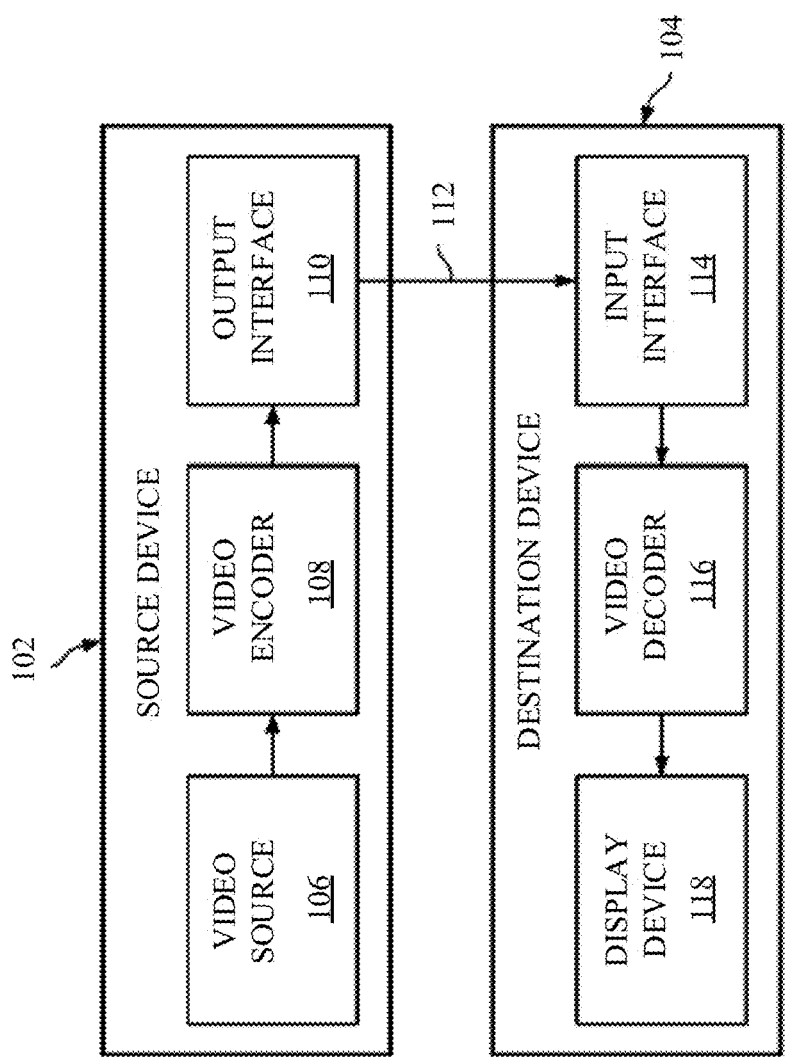
FIG. 1 shows a schematic diagram illustrating an example of a video encoding and decoding system 100.
Figure 2:
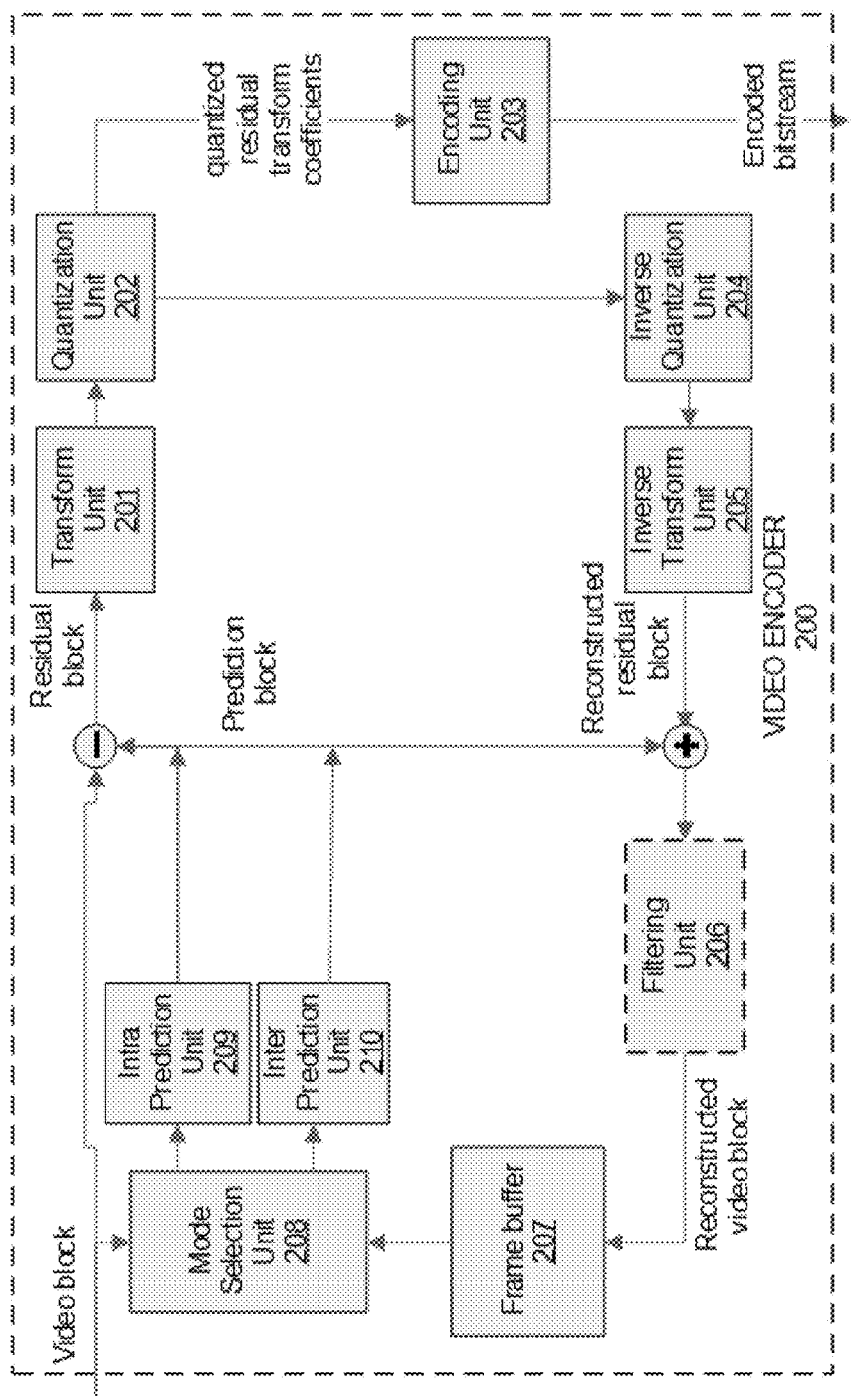
FIG. 2 shows a schematic diagram illustrating an example of a video encoder 200.
Figure 3:
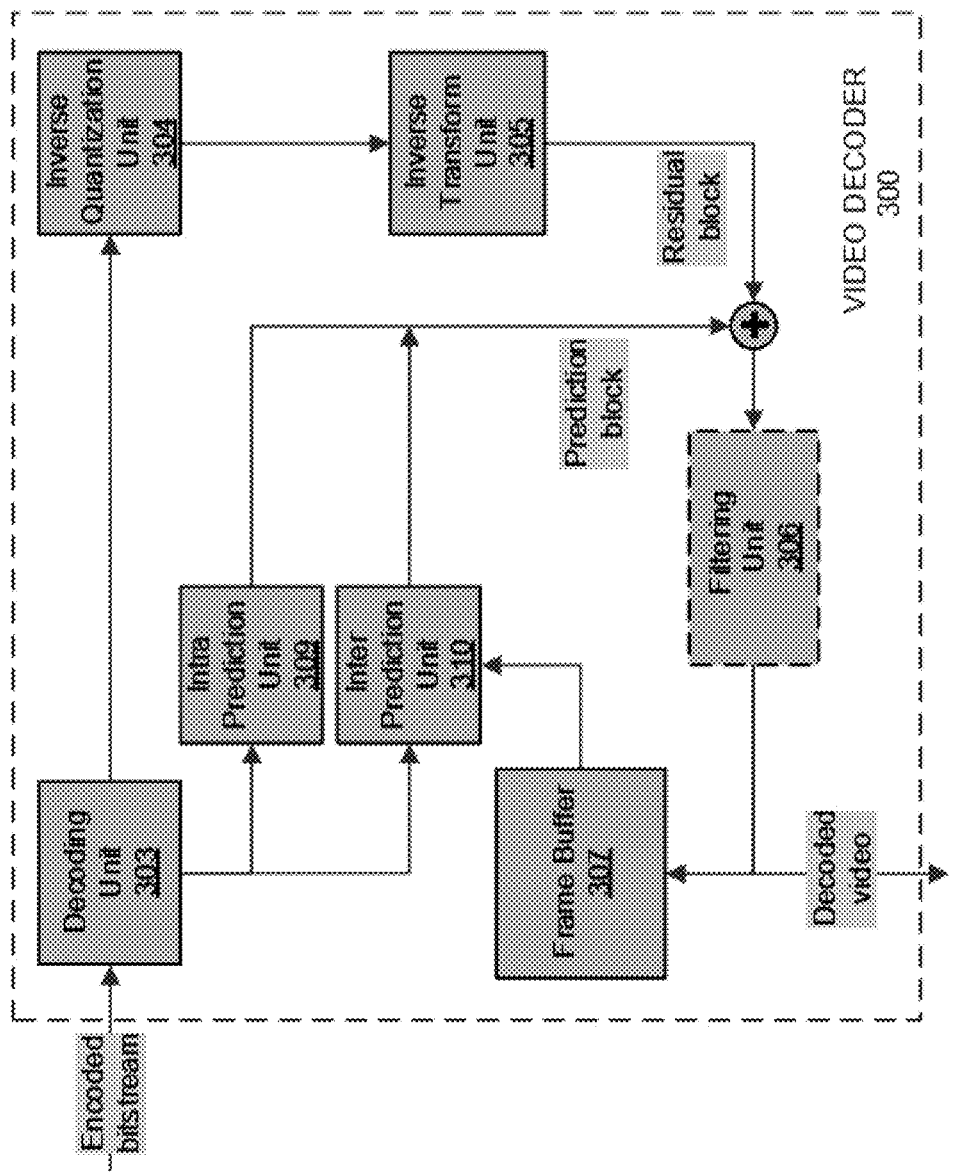
FIG. 3 shows a schematic diagram illustrating an example of a video decoder 300.

FIG. 1 is a block diagram illustrating an example video encoding and decoding system 100 that may utilize the techniques described in this disclosure, including techniques for encoding and decoding boundary partition. The system 100 is not only applied to video encoding and decoding, but also applied to picture encoding and decoding. As shown in FIG. 1, system 100 includes a source device 102 that generates encoded video data to be decoded at a later time by a destination device 104. Video encoder 200 as shown in FIG. 2, is an example of a video encoder 108 of the source device 102. Video decoder 300 as shown in FIG. 3, is an example of a video decoder 116 of the destination device 104. Source device 102 and destination device 104 may comprise any of a wide range of devices, including desktop computers, notebooks (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 102 and destination device 104 may be equipped for wireless communication.

Destination device 104 may receive the encoded video data to be decoded via a link 112. Link 112 may include any type of medium or device capable of moving the encoded video data from source device 102 to destination device 104. In one example, link 112 may comprise a communication medium to enable source device 102 to transmit encoded video data directly to destination device 104 in real-time. The encoded video data may be modulated according to a communication standard, such as a wireless communication protocol, and transmitted to destination device 104. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 104.

Alternatively, encoded data may be output from output interface 110 to a storage device (not shown in FIG. 1). Similarly, encoded data may be accessed from the storage device by input interface 114. Destination device 104 may access stored video data from storage device via streaming or download. The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 100 may be configured to support one-way or two-way video transmission to support applications such as video streaming, video playback, video broadcasting, and/or video telephony.

In the example of FIG. 1, source device 102 includes a video source 106, a video encoder 108 and an output interface 110. In some cases, output interface 110 may include a modulator/demodulator (modem) and/or a transmitter. In source device 102, video source 106 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 106 is a video camera, source device 102 and destination device 104 may form so-called camera phones or video phones. However, the techniques described in this disclosure may be applicable to video coding in general, and may be applied to wireless and/or wired applications.

The captured, pre-captured, or computer-generated video may be encoded by video encoder 108. The encoded video data may be transmitted directly to destination device 104 via output interface 110 of source device 102. The encoded video data may also (or alternatively) be stored onto the storage device for later access by destination device 104 or other devices, for decoding and/or playback.

Destination device 104 includes an input interface 114, a video decoder 116, and a display device 118. In some cases, input interface 114 may include a receiver and/or a modem. Input interface 114 of destination device 104 receives the encoded video data over link 112. The encoded video data communicated over link 112, or provided on the storage device, may include a variety of syntax elements generated by video encoder 108 for use by a video decoder, such as video decoder 116, in decoding the video data. Such syntax elements may be included with the encoded video data transmitted on a communication medium, stored on a storage medium, or stored a file server.

Display device 118 may be integrated with, or external to, destination device 104. In some examples, destination device 104 may include an integrated display device and also be configured to interface with an external display device. In other examples, destination device 104 may be a display device. In general, display device 118 displays the decoded video data to a user, and may comprise any of a variety of display devices such as a liquid crystal display (LCD), a plasma display, an organic light emitting diode (OLED) display, or another type of display device.

Video encoder 108 and video decoder 116 may operate according to any kind of video compression standard, including but not limited to MPEG-2, MPEG-4, ITU-T H.263, ITU-T H.264/MPEG-4, Part 10, Advanced Video Coding (AVC), the High Efficiency Video Coding (HEVC), ITU-T H.266/Next Generation Video Coding (NGVC) standard.

It is generally contemplated that video encoder 108 of source device 102 may be configured to encode video data according to any of these current or future standards. Similarly, it is also generally contemplated that video decoder 116 of destination device 104 may be configured to decode video data according to any of these current or future standards.

Video encoder 108 and video decoder 116 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 108 and video decoder 116 may be included in one or more encoders or decoders, either of which may be integrated as part of a combined encoder/decoder (CODEC) in a respective device.

In video coding specifications, a video sequence typically includes a series of pictures. However, it is noted that the present disclosure is also applicable to fields in case interlacing is applied. Video encoder 108 may output a bitstream that includes a sequence of bits that forms a representation of coded pictures and associated data. Video decoder 116 may receive a bitstream generated by video encoder 108. In addition, video decoder 116 may parse the bitstream to obtain syntax elements from the bitstream. Video decoder 116 may reconstruct the pictures of the video data based at least in part on the syntax elements obtained from the bitstream. The process to reconstruct the video data may be generally reciprocal to the process performed by video encoder 108.

FIG. 2 shows a schematic diagram illustrating an example of a video encoder 200. The video encoder 200 is not only applied to video encoding, but also applied to picture encoding. The video encoder 200 comprises an input for receiving input blocks of frames or pictures of a video stream and an output for generating an encoded video bit stream. The video encoder 200 is adapted to apply prediction, transformation, quantization, and entropy coding to the video stream. The transformation, quantization, and entropy coding are carried out respectively by a transform unit 201, a quantization unit 202 and an encoding unit 203 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 209. An intra frame is coded using only the information within the same frame, so that it can be independently decoded and it can provide an entry point in the bit stream for random access. Blocks of other frames of the video stream are inter coded by means of an inter prediction unit 210: information from coded frames, which are called reference frames, are used to reduce the temporal redundancy, so that each block of an inter coded frame is predicted from a block of the same size in a reference frame. A mode selection unit 208 is adapted to select whether a block of a frame is to be processed by the intra prediction unit 209 or the inter prediction unit 210.

For performing inter prediction, the coded reference frames are processed by an inverse quantization unit 204, an inverse transform unit 205, a filtering unit 206 (optional) so as to obtain the reference frames that are then stored in a frame buffer 207. Particularly, reference blocks of the reference frame can be processed by these units to obtain reconstructed reference blocks. The reconstructed reference blocks are then recombined into the reference frame.

The inter prediction unit 210 comprises as input a current frame or picture to be inter coded and one or several reference frames or pictures from the frame buffer 207. Motion estimation and motion compensation are applied by the inter prediction unit 210. The motion estimation is used to obtain a motion vector and a reference frame based on certain cost function. The motion compensation then describes a current block of the current frame in terms of the transformation of a reference block of the reference frame to the current frame. The inter prediction unit 210 outputs a prediction block for the current block, wherein said prediction block minimizes the difference between the current block to be coded and its prediction block, i.e. minimizes the residual block. The minimization of the residual block is based e.g., on a rate-distortion optimization procedure.

The difference between the current block and its prediction, i.e. the residual block, is then transformed by the transform unit 201. The transform coefficients are quantized and entropy coded by the quantization unit 202 and the encoding unit 203. The encoded video bit stream comprises intra coded blocks and inter coded blocks.

FIG. 3 shows a schematic diagram illustrating an example of a video decoder 300. The video decoder 300 is not only applied to video decoding, but also applied to picture decoding. The video decoder 300 comprises particularly a frame buffer 307, an inter prediction unit 310. The frame buffer 307 is adapted to store at least one reference frame obtained from the encoded video bit stream. The inter prediction unit 310 is adapted to generate a prediction block of a current block of a current frame from a reference block of the reference frame.

The decoder 300 is adapted to decode the encoded video bit stream generated by the video encoder 200, and both the decoder 300 and the coder 200 generate identical predictions. The features of the frame buffer 307, the inter prediction unit 310 are similar to the features of the frame buffer 207, the inter prediction unit 210, of FIG. 2.

Particularly, the video decoder 300 comprises units that are also present in the video encoder 200 like e.g., an inverse quantization unit 304, an inverse transform unit 305, a filtering unit 306 (optional) and an intra prediction unit 309, which respectively correspond to the inverse quantization unit 204, the inverse transform unit 205, the filtering unit 206 and the intra prediction unit 209 of the video encoder 200. A decoding unit 303 is adapted to decode the received encoded video bit stream and to correspondingly obtain quantized residual transform coefficients. The quantized residual transform coefficients are fed to the inverse quantization unit 304 and an inverse transform unit 305 to generate a residual block. The residual block is added to a prediction block and the addition is fed to the filtering unit 306 to obtain the decoded video. Frames of the decoded video can be stored in the frame buffer 307 and serve as a reference frame for inter prediction.

The video encoder 200 may split the input video frame into blocks before coding. The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ.

Figure 4:
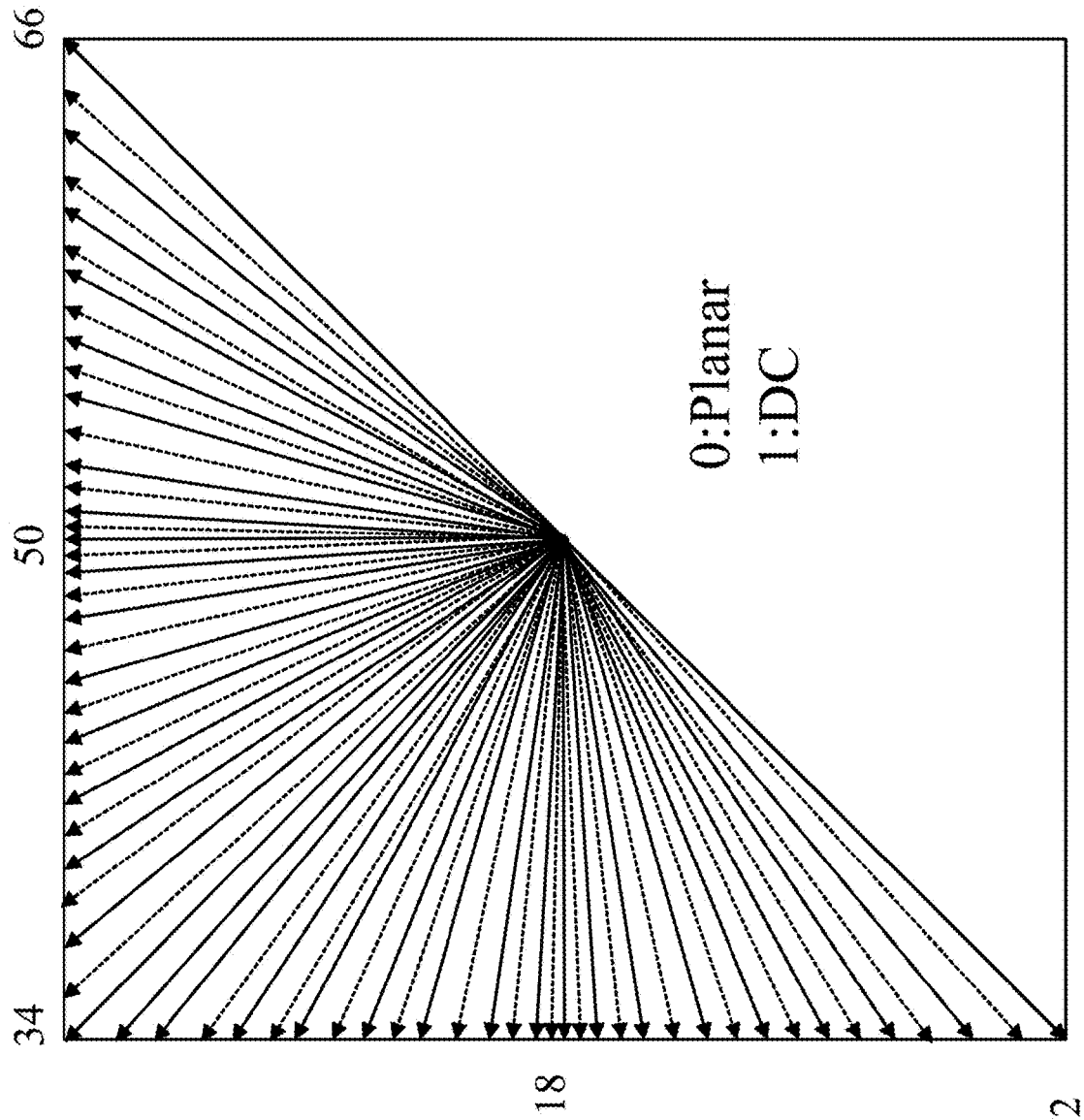
FIG. 4 shows a schematic diagram illustrating proposed 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

Figure 5:
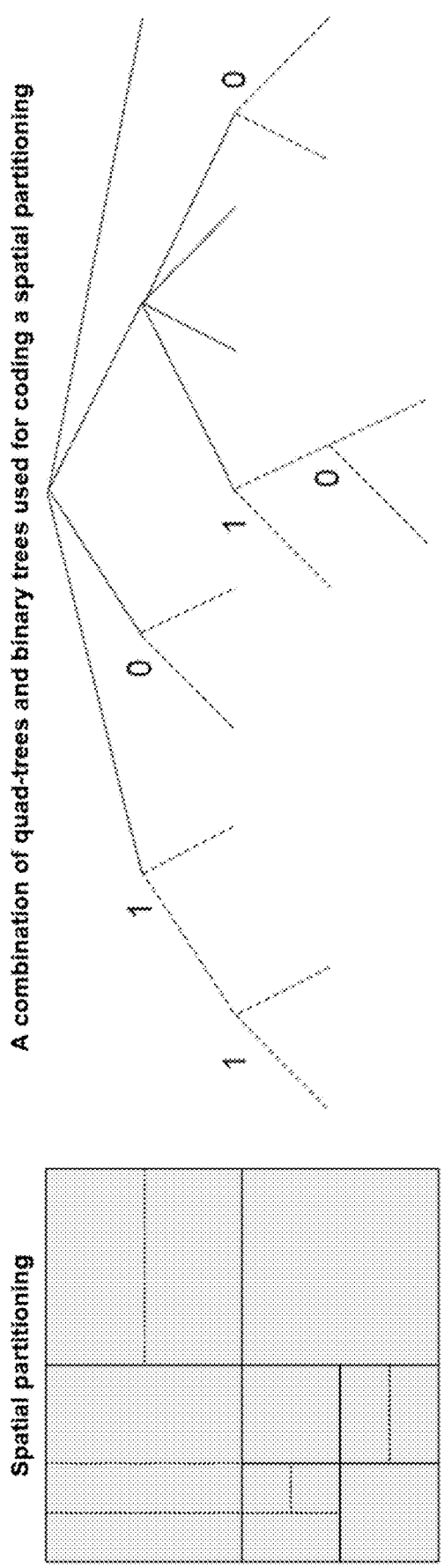
FIG. 5 shows an example of QTBT.

In VVC, a partitioning mechanism based on both quad-tree and binary tree and known as QTBT is used. As depicted in FIG. 5, QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree.

Figure 6:
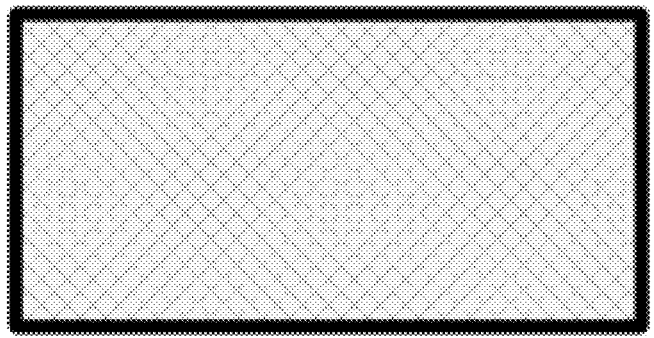
FIG. 6 shows Orientation of rectangular blocks.
Figure 6:
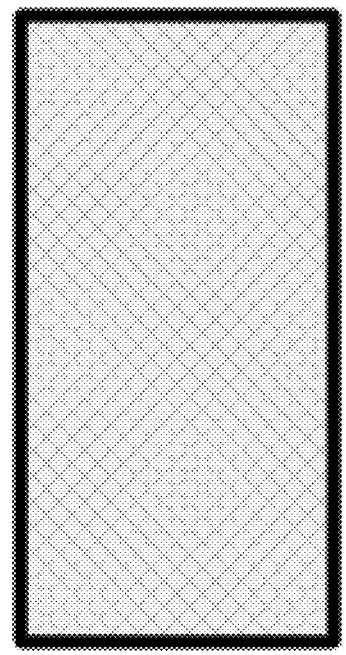

In this document, the terms of "vertically oriented block" ("vertical orientation of a block") and "horizontally oriented block" ("horizontal orientation of a block") are applied to rectangular blocks generated by the QTBT framework. These terms have the same meaning as shown in FIG. 6.

This disclosure proposes a mechanism to select different reference sample filters in order to consider orientation of a block. Specifically, width and height of a block are checked independently so that different reference sample filters are applied to reference sample located on different sides of a block to be predicted. Further, this disclosure proposes a mechanism to select different reference sample filters based on an aspect ratio of a block to be predicted and an intra prediction mode.

In prior-art review it was described that interpolation filter selection is harmonized with the decision on main reference side selection. Both of these decisions currently rely on comparison of an intra prediction mode with the diagonal (45 degree) direction.

However, it could be noticed that this design has a serious flaw for elongate blocks. It was observed that even if the shorter side is selected as the main reference using mode comparison criteria, most of the predicted pixels would still be derived from the reference samples of the longer side (shown as dashed area).

Figure 7:
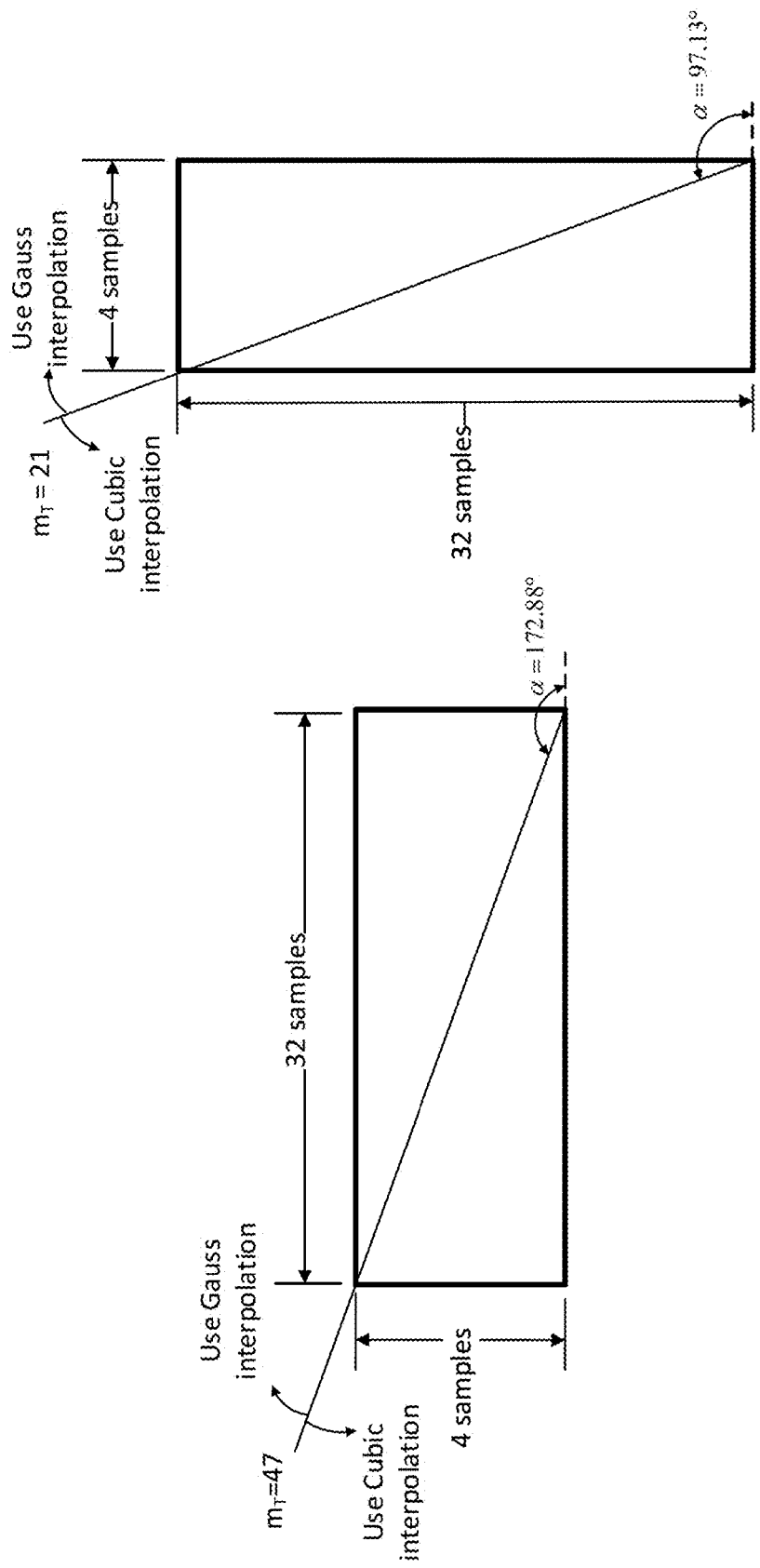
FIG. 7 is an embodiment of alternative direction for thresholding an intra prediction mode during interpolation filter selection process.

This disclosure proposes to use an alternative direction for thresholding an intra prediction mode during interpolation filter selection process. Specifically, this direction corresponds to the angle of a main diagonal of the block to be predicted. For example, for blocks of size 32×4 and 4×32, threshold mode mT used to determine a reference sample filter is defined as shown in FIG. 7.

A specific value of the threshold intra prediction angle can be calculated using the following formula:

$$\alpha_T = \arctan\left(\frac{H}{W}\right),$$

where W,H are block width and height, respectively.

Figure 8:
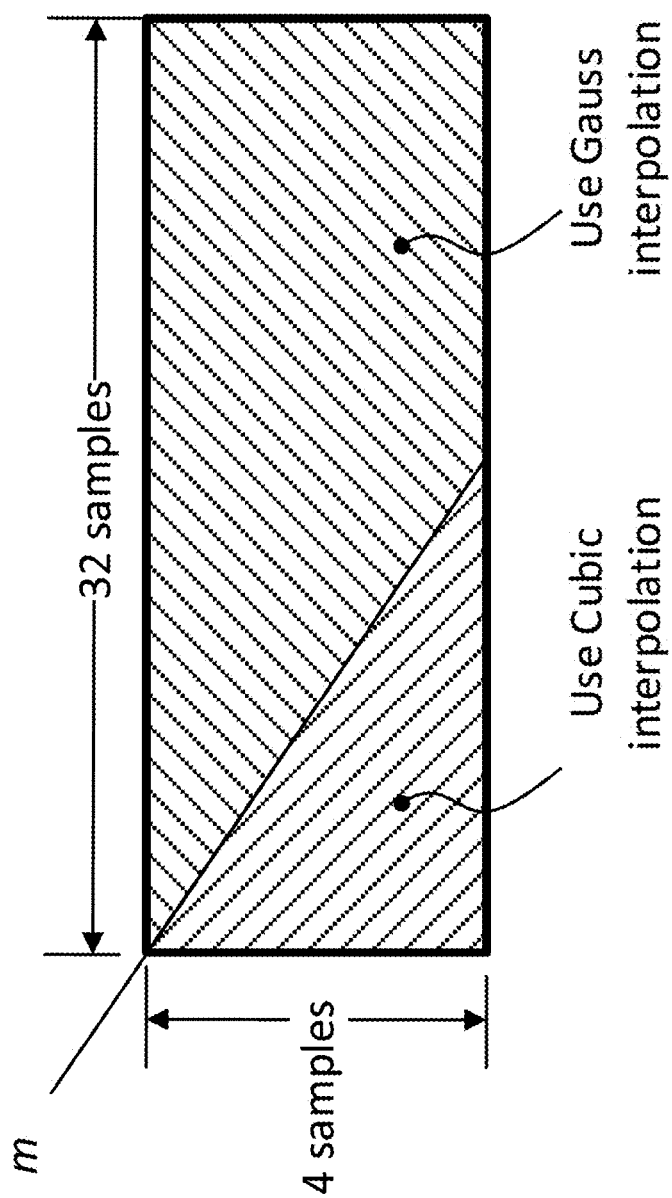

Another embodiment of the embodiment is to use different interpolation filters depending on which side the reference samples being used belong to. An example of this determination is shown in FIG. 8.

A straight line with an angle corresponding to intra direction m divides a predicted block onto two areas. Samples belonging to different areas are predicted using different interpolation filters.

Exemplary values of $m_T$ (for the set of intra prediction modes defined in BMS1.0) and corresponding angles are given in Table 1. Angles α are given as shown in FIG. 7.

TABLE 1

Exemplary values of $m_T$ (for the set of intra prediction modes defined in BMS1.0)

| Aspect ratio $R_A = \log_2(W) - \log_2(H)$ | Angle of main diagonal α, degrees | Threshold intra prediction mode $m_T$ |
|---|---|---|
| −5 | 81.78 | 19 |
| −4 | 93.57 | 19 |
| −3 | 97.13 | 21 |
| −2 | 104.04 | 23 |
| −1 | 116.57 | 27 |
| 0 | 135.00 | DIA_IDX (34) |
| 1 | 153.44 | 41 |
| 2 | 165.96 | 45 |
| 3 | 172.88 | 47 |
| 4 | 176.42 | 49 |
| 5 | 178.21 | 49 |

Samples within a block are predicted using different interpolation filters, wherein the interpolation filter used to predict a sample is selected according to an aspect ratio of the block to be predicted and the intra prediction mode. The interpolation filter may in particular be selected according to block shape, orientation being horizontal or vertical and intra prediction mode angle.

The embodiment may also be applied at the stage of reference sample filtering. In specific, it is possible to determine a reference sample smoothing filter (e.g. for intra-prediction) using similar rules described above for interpolation filter selection process. For instance, the smoothing filter may be selected according to an aspect ratio of the block to be predicted and the intra prediction mode. The smoothing filter may in particular be selected according to block shape, orientation being horizontal or vertical, and intra prediction mode angle.

A set of conditions that determine whether reference samples are filtered is controlled by Mode-dependent Intra Smoothing technique (MDIS). For example, the set of conditions may comprise an MDIS condition. Depending on width and height of the predicted block, a decision on whether a [1 2 1] filter is applied to reference samples may be taken. The MDIS decision can be also used to switch between interpolation filters. E.g., when the MDIS condition is true, a Gaussian filter is selected for interpolation. Otherwise, i.e. when the MDIS condition is not true, a cubic filter is used.

The MDIS condition can be checked by performing the following steps:

Step one: a tabular index is determined by calculating (log 2 (W)+log 2 (H))>>1. In particular, the index is determined based on the aspect ratio of the block to be predicted.

Step two: find the absolute value of a difference between an intra-prediction mode and a horizontal intra-prediction mode and the absolute value of a difference between the intra-prediction mode and a vertical intra-prediction mode.

Select the minimum between these absolute values of differences. In particular, a minimum value from said two absolute values of difference is selected.

Step three: compare the value determined at the previous step, i.e. the minimum value, with the value that is fetched from the table using the index calculated at step one. For instance, the value may be fetched from the following table:

| Index | Value |
|-------|-------|
| 0 | 20 |
| 1 | 20 |
| 2 | 20 |
| 3 | 14 |
| 4 | 2 |
| 5 | 0 |
| 6 | 0 |

The proposed arrangement suggests to modify the above-described MDIS condition check, in order to consider a block that is non-square. In particular, an offset value is added to the value obtained at step 3, i.e. to the value fetched from the table. The value fetched from the table may be modified by the offset value to obtain a threshold value. This threshold value may then be compared with the minimum value determined at step two, instead of directly comparing the fetched value with the minimum value determined at step two. Notably, the MDIS condition is true, if the minimum value determined at step two is greater than the threshold value determined at the modified step 3. The offset value is applied to the fetched value, in particular the offset value is non-zero, if all of the following checks succeed:
  a. Check whether a shorter side of a block, in particular the block to be predicted, is at least twice shorter than the larger side
  b. Check whether a shorter side length of the block exceeds a threshold. This threshold length could be set equal to 2, 4, 8 or 16.
  c. Check whether an intra prediction mode direction is between the horizontal intra prediction mode and the vertical intra prediction mode.
  d. If the block width is greater than the block height, check if an intra prediction mode is less than DIA_IDX+dirOffset, i.e., less than the sum of a diagonal intra prediction mode (see Table 1) and a directional offset, otherwise, check if an intra prediction mode is greater than DIA_IDX+dirOffset. The value of dirOffset can be pre-determined (e.g. set equal to 5), or it can depend on the aspect ratio of a block (e.g., for aspect ratios 1:2, 1:4, 1:8, 1:16, the value of dirOffset will be correspondingly assigned to 5, 6, 7, 7).

If all of these checks succeed and the block width is greater than the block height, the value obtained at step 3 is decreased by a pre-determined offset value (e.g., equal to dirOffset, or equal to abs(dirOffset)). If all of these checks succeed and the block width is less than the block height, the value obtained at step 3 is increased by a pre-determined offset value (e.g., equal to dirOffset, or equal to abs(dirOffset)).

FIG. 9 is a block diagram of an apparatus (or device) 1100 that can be used to implement various embodiments. For instance, the apparatus 1100 can be used to implement the above-proposed mechanism of the present disclosure. The apparatus 1100 can be configured to determine an intra prediction mode and an aspect ratio of a block to be predicted, and to select an interpolation filter or a smoothing filter based on the determined intra prediction mode and determined aspect ratio. In particular, the apparatus 1100 can be configured to determine a MDIS condition, which depends on the intra prediction mode and the aspect ratio of the block to be predicted, and then select the interpolation filter or the smoothing filter based on the determined MDIS condition. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1100 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation is, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for performing switching of an intra reference sample filter for intra-prediction, the method comprising performing:
    determining an intra prediction mode of a block to be predicted;
    determining an aspect ratio of the block to be predicted;
    determining, based on the intra prediction mode and the aspect ratio of the block to be predicted, a mode-dependent intra smoothing (MDIS) condition;
    selecting, based on the MDIS condition, the intra reference sample filter for performing the intra-prediction, wherein the intra reference sample filter is used to perform, for the intra-prediction, an interpolation filtering or a reference sample smoothing filtering,
    wherein the determining the MDIS condition includes:
        determining an index based on the aspect ratio of the block to be predicted,
        selecting a minimum value from an absolute value of a difference between the intra prediction mode and a horizontal intra prediction mode and an absolute value of a difference between the intra prediction mode and a vertical intra prediction mode,
        fetching a value from a table using the index,
        modifying the value fetched from the table by an offset value to obtain a threshold value, and
        comparing the minimum value with the threshold value,
        wherein the MDIS condition is true if the minimum value is greater than the threshold value.

2. The method of claim 1, wherein the aspect ratio is determined based on a width and a height of the block to be predicted.

3. The method of claim 2, wherein the aspect ratio is determined by:

$R_A = \log_2(W) - \log_2(H)$, where:
    W is width of the block to be predicted, and
    H is height of the block to be predicted.

4. The method of claim 1, wherein the interpolation filter includes a cubic interpolation filter or a Gauss interpolation filter.

5. The method according to claim 4, wherein the selecting comprises:
    selecting the cubic interpolation filter if the MDIS condition is true, and
    selecting the Gauss interpolation filter if the MDIS condition is not true.

6. The method according to claim 1, wherein the offset value is a non-zero value if the following conditions are fulfilled:
    the shorter side of the block to be predicted is at least twice shorter than the larger side of the block to be predicted; and
    the shorter side of the block to be predicted exceeds a threshold length; and
    the intra prediction mode is between the horizontal intra prediction mode and the vertical intra prediction mode; and
    the intra prediction mode is:
        less than the sum of a diagonal intra prediction mode and a directional offset, for instances where a width of the block to be predicted is greater than a height of the block to be predicted; or
        greater than the sum of the diagonal intra prediction mode and the directional offset, for instances where a width of the block to be predicted is not greater than a height of the block to be predicted.

7. The method according to claim 6, wherein the threshold length is a sample quantity taken from the group consisting of: 2, 4, 8, and 16.

8. The method according to claim 6, wherein the value of the directional offset is either a pre-determined value or a value that depends on the aspect ratio.

9. The method according to claim 7, wherein:
    the value of the directional offset is 5, if the aspect ratio is 1:2;
    the value of the directional offset is 6, if the aspect ratio is 1:4;
    the value of the directional offset is 7, if the aspect ratio is 1:8; and/or
    the value of the directional offset is 7, if the aspect ratio is 1:16.

10. The method according to claim 1, wherein the offset value is the directional offset or is the absolute value of the directional offset.

11. The method according to claim 1, comprising:
    decreasing the value fetched from the table, if a width of the block to be predicted is greater than its height; and
    increasing the value fetched from the table, if a width of the block to predicted is lesser than its height.

12. A device for performing switching of an intra reference sample filter for intra-prediction, the device comprising:
    a processor; and
    a non-transitory computer-readable medium including computer-executable instructions such that, execution of the instructions by the processor cause the device to carry out a method comprising performing:
    determining an intra prediction mode of a block to be predicted;
    determining an aspect ratio of the block to be predicted;
    determining, based on the intra prediction mode and the aspect ratio of the block to be predicted, a mode-dependent intra smoothing (MDIS) condition;
    selecting, based on the MDIS condition, the intra reference sample filter for performing the intra-prediction, wherein the intra reference sample filter is used to perform, for the intra-prediction, an interpolation filtering or a reference sample smoothing filtering,
    wherein the determining the MDIS condition includes:
        determining an index based on the aspect ratio of the block to be predicted,
        selecting a minimum value from an absolute value of a difference between the intra prediction mode and a horizontal intra prediction mode and an absolute value of a difference between the intra prediction mode and a vertical intra prediction mode,
        fetching a value from a table using the index,
        modifying the value fetched from the table by an offset value to obtain a threshold value, and comparing the minimum value with the threshold value,
wherein the MDIS condition is true if the minimum value is greater than the threshold value.

13. The device according to claim 12, wherein the device is a video encoder or a video decoder.

14. The device according to claim 12, wherein the device is a video encoder.

15. The device according to claim 12, wherein the device is a video decoder.

16. A computer program product comprising a program code for performing switching of an intra reference sample filter for intra-prediction, the method comprising performing:
determining an intra prediction mode of a block to be predicted;
determining an aspect ratio of the block to be predicted;
determining, based on the intra prediction mode and the aspect ratio of the block to be predicted, a mode-dependent intra smoothing (MDIS) condition;
selecting, based on the MDIS condition, the intra reference sample filter for performing the intra-prediction, wherein the intra reference sample filter is used to perform, for the intra-prediction, an interpolation filtering or a reference sample smoothing filtering,
wherein the determining the MDIS condition includes:
determining an index based on the aspect ratio of the block to be predicted,
selecting a minimum value from an absolute value of a difference between the intra prediction mode and a horizontal intra prediction mode and an absolute value of a difference between the intra prediction mode and a vertical intra prediction mode,
fetching a value from a table using the index,
modifying the value fetched from the table by an offset value to obtain a threshold value, and
comparing the minimum value with the threshold value,
wherein the MDIS condition is true if the minimum value is greater than the threshold value.

17. The device of claim 12, wherein the aspect ratio is determined based on a width and a height of the block to be predicted.

18. The device of claim 17, wherein the aspect ratio is determined by:

$$R_A = \log_2(W) - \log_2(H),$$

where:
W is width of the block to be predicted, and
H is height of the block to be predicted.

19. The device of claim 12, wherein the interpolation filter includes a cubic interpolation filter or a Gauss interpolation filter.

20. The device of claim 19, wherein the selecting comprises:
selecting the cubic interpolation filter if the MDIS condition is true, and
selecting the Gauss interpolation filter if the MDIS condition is not true.

* * * * *